United States Patent [19]

Bockenheuser

[11] Patent Number: 4,840,418

[45] Date of Patent: Jun. 20, 1989

[54] PROTECTIVE SHIELD AND METHOD OF FASTENING PROTECTIVE SHIELD TO A FRAME

[75] Inventor: Charles A. Bockenheuser, Tulsa, Okla.

[73] Assignee: Pardners Unlimited, Inc., Tulsa, Okla.

[21] Appl. No.: 177,826

[22] Filed: Mar. 24, 1988

Related U.S. Application Data

[63] Continuation of Ser. No. 9,816, Feb. 2, 1987, abandoned.

[51] Int. Cl.$^4$ ............................................. B60J 1/20
[52] U.S. Cl. .................................. 296/91; 296/78.1; 403/283
[58] Field of Search .................... 296/91, 78.1, 15; 180/68.6; 403/274, 283, 284, 282, 279; 29/505

[56] References Cited

U.S. PATENT DOCUMENTS

| | | | |
|---|---|---|---|
| 2,236,846 | 4/1941 | Davisson | 296/91 |
| 2,700,398 | 1/1955 | Green | 403/283 |
| 3,815,700 | 6/1974 | Mittendorf | 180/68 P |
| 4,153,129 | 5/1979 | Redmond | 180/68 P |
| 4,627,657 | 12/1986 | Daniel et al. | 296/91 |

Primary Examiner—Robert R. Song
Attorney, Agent, or Firm—Laney, Dougherty, Hessin & Beavers

[57] ABSTRACT

A protective shield assembly and method for mechanically fastening a protective shield to a frame includes a shield, a frame, a mechanical fastener, and an attachment mechanism. The frame includes a channel defined by a front wall, a rear wall, and bottom. The mechanical fastener is effected by a plurality of serrations which extend partially across the channel from one or both of the front and rear wall. The serrations allow the shield to be inserted into the channel and mechanically connect to the surface of the inserted shield in order to prevent extraction of the shield from the channel. The mechanical connection of the serrations to the surface of the shield is enhanced by crimping a wall of the channel in order to crimp the serrations into the surface of the shield and to create dimples in the frame which penetrate the surface of the shield farther than the serrations.

24 Claims, 2 Drawing Sheets

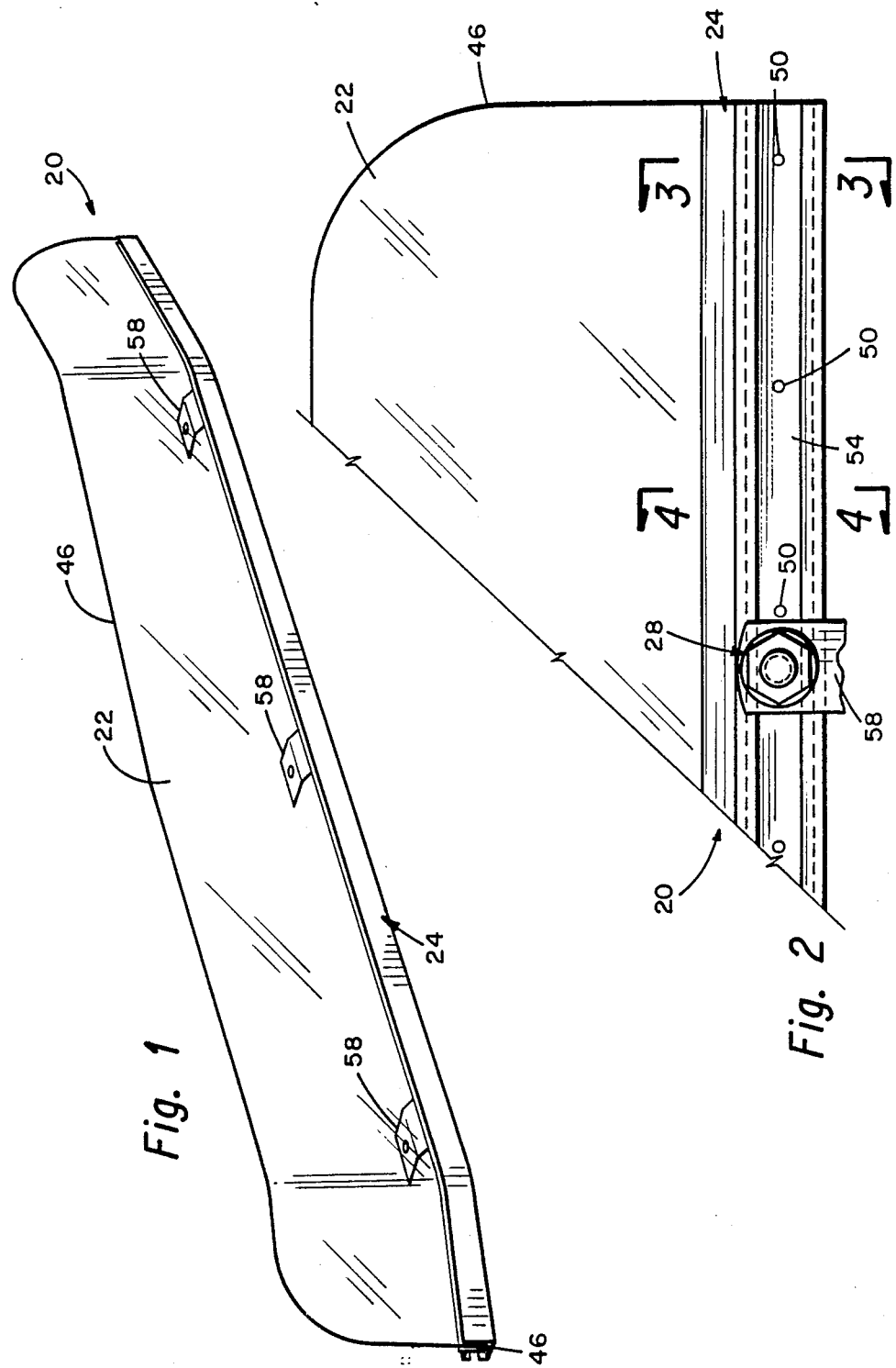

PROTECTIVE SHIELD AND METHOD OF FASTENING PROTECTIVE SHIELD TO A FRAME

This is a continuation of co-pending application Ser. No. 07/009,816, filed on Feb. 2, 1987, now abandoned.

BACKGROUND OF THE INVENTION

This invention relates to an improved protective shield and method of fastening a protective shield to a frame and more particularly to such a protective shield used with vehicles, such as automobiles and trucks.

Protective shields for motorcycles, automobiles, trucks, and other vehicles have been known in the art for some time. Examples of prior art deflector shields for automobiles are disclosed in U.S. Pat. No. 2,236,846, U.S. Pat. No. 3,815,700, and U.S. Pat. No. 4,153,129.

A drawback to the protective shields known in the art is the absence of a durable method of mechanically fastening the shield, which is commonly made of translucent thermoplastic polymer, to the frame which is used to attach the protective shield to the vehicle. Prior deflector shields have been either mechanically fastened to the frame with bolts, rivets, screws, etc. or have been fastened to the frame with an adhesive. The bolts, rivets, screws, etc. of prior mechanical fastenings required apertures in the shield which weaken the shield and increase the probability of cracking or shattering of the shield. Also, bolts, rivets, screws, etc. tend to loosen under the mechanical vibrations and wind forces and pulsations presented by an automobile. Adhesive fastenings may fatigue or lose adhesive strength under long term use, under the extreme temperature ranges and weather conditions, or under the mechanical vibrations and wind forces presented with attachment to a motor vehicle. Also, the prior mechanical and adhesive fastenings require increased production cost because of the labor required to install the bolts, rivets, screws, chemicals, or adhesives and the costs of the mechanical fastenings and adhesives themselves.

SUMMARY OF THE INVENTION

Accordingly, it is an object and advantage of this invention to provide a protective shield assembly and a method of fastening a protective shield to a frame which does not require adhesives, bolts, rivets, screws, etc. or apertures in the shield.

It is a further object and advantage of this invention to provide a protective shield assembly in which the frame and mechanical fastening means used for fastening the shield to the frame are made of one extrusion thereby eliminating separate manufacture and assembly.

It is a further object and advantage of this invention to eliminate the labor required to fasten a shield to a frame with bolts, rivets, screws, or adhesives and therefore to reduce the labor costs involved in assembling the protective shield.

The protective shield and method of the present invention include a shield, a frame, mechanical fastening means, and attachment means. The frame includes a channel defined by a front wall, a rear wall, and a bottom. The mechanical fastening means extends partially across the channel from one or both of the front wall and the rear wall and is positioned to allow the edge of the shield to be inserted into the channel beyond the mechanical fastening means and to mechanically connect to the surface of the shield in order to prevent extraction of the inserted shield from the channel. The mechanical fastening means may be embodied as a serration or serrations which extend from one or both of the walls of the channel. The channel is crimped after insertion of the shield into the channel in order to increase the penetration of the serrations into the surface of the shield and to create dimples in the frame which penetrate the surface of the shield farther than the serrations. The attachment means are connected to the frame and used to attach the protective shield assembly to a vehicle.

BRIEF DESCRIPTION OF THE DRAWINGS

The present invention will be better understood by reference to the examples of the following drawings:

FIG. 1 is a perspective view of a preferred embodiment of the protective shield assembly of the present invention;

FIG. 2 is a partial rear view of the protective shield assembly of FIG. 1;

DETAILED DESCRIPTION OF THE PREFERRED EMBODIMENTS

Before explaining the present invention in detail, it is to be understood that the invention is not limited to the details of construction and arrangement of parts illustrated in the accompanying drawings, since the invention is capable of other embodiments and of being practiced and carried out in various ways commensurate with the claims herein. Also, it is to be understood that the terminology employed herein is for the purpose of description and not of limitation.

FIGS. 1 through 4 present a preferred embodiment of a protective shield assembly, generally designated 20, which exemplifies the present invention. The illustrated embodiment is a deflector shield for motor vehicles such as automobiles and trucks, and is sized and arranged to attach to front end of the hood of the automobile so as to deflect the oncoming air currents, bugs, and other air-borne matter to pass over the top of the automobile. As will be obvious from the following explanation, the components of the invention may be easily arranged to adapt to any object which requires a protective shield.

Figure 4:
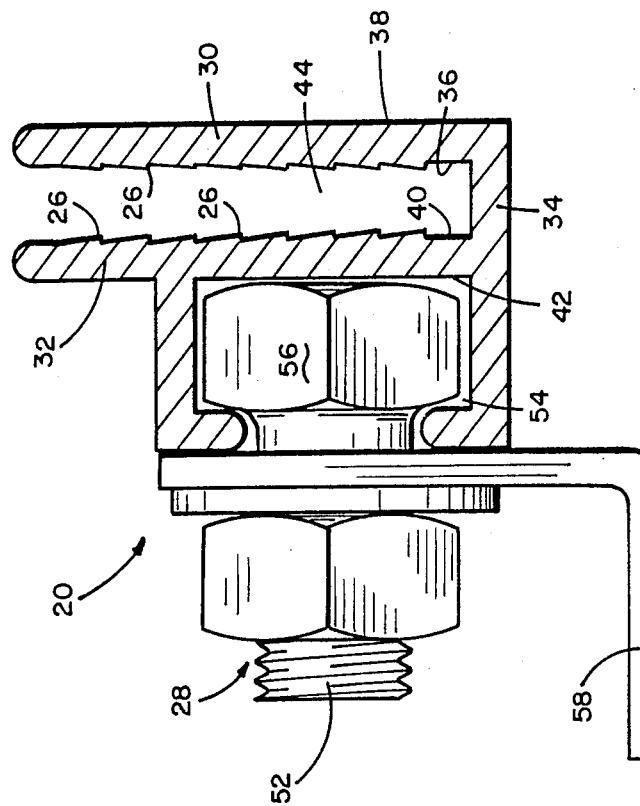
FIG. 4 is a sectional view along Line 4—4 of FIG. 2 with the shield removed to better reveal the structure of the frame.
Figure 3:
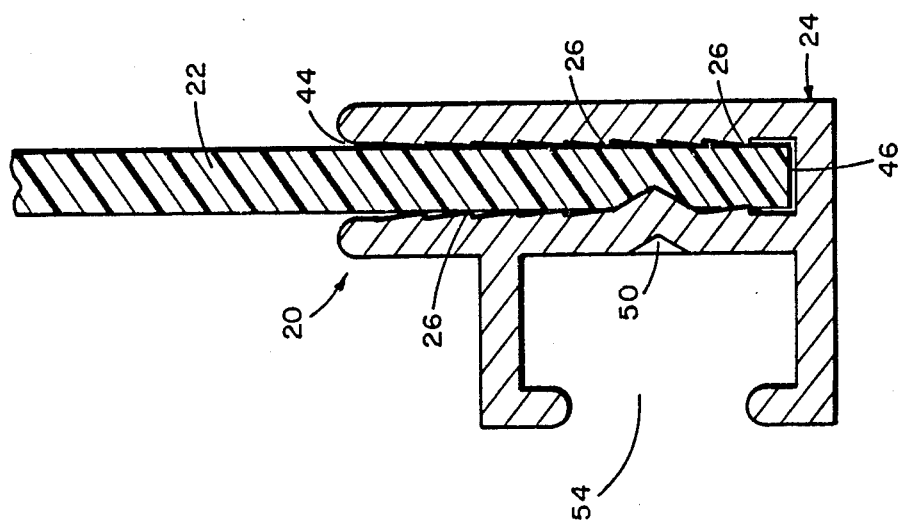
FIG. 3 is a sectional view along Line 3—3 of FIG. 2.

Referring to the example of FIGS. 3 and 4, the invention may be described as being generally comprised of a shield 22, a frame 24, mechanical fastening means 26, and attachment means 28. The frame 24 includes a front wall 30, a rear wall 32 spaced apart from the front wall, and a bottom 34. The bottom 34 should securely connect the front wall 30 to the rear wall 32. The front wall 30 has an inside 36 facing the rear wall 32 and an outside 38. The rear wall 32 has an inside 40 facing the front wall 30 and an outside 42. The front wall 30, rear wall 32, and bottom 34 form a channel 44.

The shield has at least one edge 46. The mechanical fastening means 26 should extend partially across the channel 44, i.e., less than completely across the channel, from at least one of the front wall 30 or the rear wall 32, and should allow the edge 46 of the shield 22 to be inserted into the channel 44 beyond fastening means 26, as best seen in FIG. 3. The mechanical fastening means 26 mechanically fastens the inserted shield 22 into the channel 44 by mechanically connecting to the surface of the shield 22 and thereby prevents extraction of the inserted shield 22 from the channel 44.

Referring again to FIG. 4, the preferred mechanical fastening means 26 is effected with the use of at least one serration, also designated 26. More preferably, the fastening means 26 is effected by a plurality of serrations 26 located at varying distances from the bottom 34 of the channel. The edge or tooth of the serrations 26 should be angled toward the bottom 34 of the channel 44 in order to allow the shield 22 to be inserted into the channel 44 and should be sharp enough to penetrate the surface of the inserted shield 22 and prevent extraction of the inserted shield 22 from the channel 44. The serrations 26 should extend far enough across the channel 44 to securely engage the shield 22 by penetrating the surface of the shield. The serrations 26 should not penetrate completely through the shield 22 or penetrate the shield deeply enough to weaken the shield and cause breakage. In a preferred embodiment, the serrations 26 near the bottom 34 of the channel 44 extend farther across the channel 44 than the serrations 26 more distant from the bottom of the channel. This feature facilitates insertion of the shield 22 into the channel and allows the serrations 26 near the bottom of the channel to more deeply penetrate the surface of the shield 22 and therefore to more securely fasten the shield 22 in the channel 44. Also, in a preferred embodiment, the distance from the inside 36 of the front wall 30 to the inside 40 of the rear wall 32 is about equal to the thickness of the shield 22 in order to promote penetration of virtually the entire height of the serrations 26 into the surface of the shield 22.

The serration(s) 26 preferably extend along the inside of one or both of the front wall 30 and rear wall 32 for approximately the length of the channel 44, and are generally parallel to the longitudinal axis of the channel 44. Referring to FIG. 4, in the illustrated preferred embodiment the serrations 26 are provided on both the inside 36 of the front wall 30 and the inside 40 of the rear wall 32 and extend for the entire length of the channel 44 in order to maximize the ability of the channel to prevent extraction of the shield 22.

Referring to FIGS. 2 and 3, in a preferred embodiment at least one crimp 50 is located in at least one of the front wall 30 or the rear wall 32 after the edge 46 of the shield 22 is inserted into the channel 44 in order to drive or crimp the serrations 26 farther into the surface of the shield 22 and increase the fastening strength of the frame 24 to the shield 22. This crimping compensates for any expansion of the channel 44 due to the insertion of the shield 22 and assures that the serrations 26 are securely engaged with the surface of the shield 22. In the preferred embodiment the crimps 50 are spaced apart dimples 50 in the outside 42 of the rear wall 32. The crimps 50 are placed in the rear wall 32 to avoid marring the front wall 30 of the frame 24. The crimps 50 are created by a mechanical press commonly used in production lines. Referring to FIG. 3, in the preferred embodiment, the dimples 50 penetrate the surface of the shield 22 farther than the serrations in order to increase the mechanical fastening strength of the frame 24 to the shield 22.

In the preferred embodiment, the frame 24 and mechanical fastening means or serrations 26 are made of one piece of extruded aluminum. It is recommended that the aluminum be heat treated to increase the strength of the frame 24 and serrations 26. There are many other acceptable materials, particular metal and metal alloys. At the current time, materials which lend themselves to extrusion are advantageous because of the economies of scale inherent in the extrusion process and the fact that extruding the frame 24, channel 44, and mechanical fastening means 26 in one piece eliminates the labor required to assemble these elements if independently manufactured. There are equivalent ways of making the serrations 26, such as punching teeth in the walls with a punch-type press or mechanically fastening teeth to the walls 30, 32 of the channel. Regardless of the material or method of manufacture used, the material should be strong enough to assure that the serrations 26 will securely and positively penetrate the surface of the shield 22 and will hold the crimps 50, discussed above.

The shield 22 should be made of a material which will accept penetration of the serrations 26, which is strong enough to hold against tensile forces placed on the shield 22 by the serrations 26, and which is pliable or non-brittle enough to resist chipping or shattering when penetrated by serrations 26. Preferably, the shield 22 is made of thermoplastic. More preferably, the shield 22 is made of a transparent of translucent thermoplastic such as acrylic resin or polycarbonate. Most preferably, the shield is made of a translucent polycarbonate.

The frame 24 and shield 22 may be bent as necessary to fit the requirements of a specific situation. The protective shield assembly 20 illustrated in FIG. 1 has a bend near each end in order to conform to the shape of a Ford-type truck. The frame may be curved, bent in the middle, straight, etc. and the shield 22, particularly if made of thermoplastic, may be easily formed to fit the shape of the frame. If the shield 22 is made of polycarbonate it will flex to fit the shape of the frame 24 without stressing the shield 22 and without any special pre-bending or pre-shaping operations as required by other materials and thermoplastics. The described shield 22 is of one unbroken piece of material, although the shield may be fragmented if desired or advantageous for the physical characteristics of a different application.

Extruding the frame 24, channel 44, and mechanical fastening means 26 in one piece greatly simplifies the method, or assembly process, involved in fastening the shield 22 to the frame 24. Conceivably, the shield 22 can be fastened to the frame 24 in a one step process, that is, simply inserting the shield 22 into the frame 24. In order to reduce the effort required to insert the shield 22 into the channel 44, the preferred method of fastening is essentially a two step process, the first step being the insertion of the shield 22 into the channel 24 and the second step being placing the protective shield assembly 20 into a mechanical press and crimping the channel 44 in order to crimp the serrations or mechanical fastening means 26 into the shield 22 and increase the penetration of the serrations 26 into the surface of the shield 22. Preferably, the crimping step includes making dimples 50 in the frame. The dimples 50 should penetrate the surface of the shield 22 farther than the serrations 26, as illustrated in FIG. 3, in order to increase the strength with which the frame 24 mechanically fastens to the shield 22. This method of fastening the shield 22 to the channel 44 of the frame 24 is much simpler than the prior methods which required manually installing adhesive in the channel or riveting or bolting the shield 22 to frame 24. If it is desired to bend the frame 24 and shield 22 the same press which crimps the frame 24 can be provided with a second set of stops or a second position into which the crimped frame is placed for bending. As mentioned above, if a polycarbonate shield 22 is used, the polycarbonate is flexible enough it will conform to the frame as bent, thus eliminating any additional labor and processing necessary to bend the shield 22.

Referring to FIG. 1, when the protective shield 20 is to be used with a motor vehicle it is preferable to fasten the frame 24 to the lower edge of shield 22, attach the frame 24 near the top, forward end of the vehicle, and allow the shield to extend above the frame 24 in such a manner as to direct or deflect the air currents, bugs, and other matter away from the vehicle and its occupants when the vehicle is in forward motion. As is intended to be obvious from this description, a frame 24 may be easily fastened to any edge 46 or more than one edge of the shield 22 if desired or advantageous for the physical characteristics of a different application.

The attachment means 28 function to attach the assembled protective shield 20 to the object or vehicle to be protected. In the preferred embodiment, the attachment means 28 are located on the outside 42 of the rear wall 40 of channel 44 in order to structurally reinforce the rear wall 40 of the channel 44. As best seen in FIGS. 1 and 4, this positioning of the attachment means 28 opposes any forces placed on the opposite, front wall 30 of the protective shield 20 and channel 44 by wind currents or other objects striking the protective shield assembly 20. In the preferred embodiment, best seen in FIG. 4, a bolt 52 is attached to the rear wall 32 of the frame 24 using slot 54. The bolt head 56 is slid into the slot 54 from the end of the channel 44 leaving the shaft of the bolt extending out the rear of the slot 54 as illustrated in FIG. 4. A mounting bracket 58 is then attached to the threaded end of the bolt 52 and the mounting bracket 58 is attached to the motor vehicle with mechanical fasteners such as metal screws. As many bolts 52 and mounting brackets 58 are used as is necessary to securely attach the protective shield assembly to the vehicle. This type of mounting is particularly suitable for automobiles, and it is intended that the attachment means 28 take other forms as required by other specific situations. For example, the frame may be welded or chemically bonded to the object upon which the protective shield 20 is to be mounted. Also, the frame 24 may be extruded into other shapes which would allow the frame 24 and protective shield 20 to be riveted, bolted, or screwed directly to an object without using mounting brackets 58.

While the invention has been described with a certain degree of particularity, it is manifest that many changes may be made in the details of construction and the arrangement of components without departing from the spirit and scope of this disclosure. It is to be understood that the invention is not limited to the embodiments set forth herein for purposes of exemplification, but is to be limited only by the scope of the attached claim or claims including the full range of equivalency to which each element thereof is entitled.

What is claimed is:

1. A protective shield assembly, comprising:
   a shield having at least one edge;
   a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel; and
   mechanical fastening means, extending partially across the channel from at least one of the front wall and the rear wall, for adhesive-independently fastening the edge of the shield into the channel, the fastening means mechanically connecting to the surface of the shield in order to prevent extraction of the shield from the channel.

2. The assembly of claim 1:
   wherein the mechanical fastening means penetrates the surface of the shield in order to prevent extraction of the shield from the channel.

3. The assembly of claim 1 in which the mechanical fastening means comprises:
   at least one crimp, the crimp being located in at least one of the front wall and the rear wall after the edge of the shield is inserted into the channel, the crimp penetrating the surface of the shield in order to prevent extraction of the shield from the channel.

4. The assembly of claim 1, further comprising:
   at least one crimp, each crimp being placed in at least one of the front wall and the rear wall after the edge of the shield is inserted into the channel so that the mechanical fastening means and the crimp are crimped into and penetrate the surface of the shield thereby adhesive-independently fastening the shield to the channel.

5. The assembly of claim 1 in which the mechanical fastening means comprises:
   at least one serration, the serration extending partially across the channel from at least one of the front wall and the rear wall, the serration allowing the edge of the shield to be inserted into the channel beyond the serration, the serration mechanically connecting to the surface of the inserted shield in order to prevent extraction of the inserted shield from the channel.

6. The assembly of claim 5:
   wherein the serration extends along the inside of at least one of the front wall and the rear wall for about the length of the channel, the serration being generally parallel to the longitudinal axis of the channel.

7. The assembly of claim 1 in which the mechanical fastening means comprises:
   a plurality of serrations, the serrations being located at varying distances from the bottom of the channel.

8. The assembly of claim 7:
   wherein the serrations near the bottom of the channel extend farther across the channel than the serrations more distant from the bottom of the channel.

9. The assembly of claim 1, further comprising:
   attachment means for attaching the frame to a vehicle.

10. The assembly of claim 2:
    wherein the shield is polycarbonate.

11. A protective shield assembly, comprising:
    a shield having at least one edge;
    a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel; and
    mechanical fastening means, extending partially across the channel from at least one of the front wall and the rear wall, for adhesive-independently fastening the edge of the shield into the channel, the fastening means penetrating the surface of the shield in order to prevent extraction of the shield from the channel.

12. The assembly of claim 11 in which the mechanical fastening means comprises:
at least one crimp, each crimp being placed in at least one of the front wall and the rear wall after the edge of the shield is inserted into the channel.

13. The assembly of claim 11 in which the mechanical fastening means comprises:
at least two dimples, each dimple being placed in at least one of the front wall and the rear wall after the edge of the shield is inserted into the channel.

14. A protective shield assembly, comprising:
a shield having at least one edge;
a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel;
at least two serrations, at least one serration extending partially across the channel from each of the front wall and rear wall, the serrations allowing the edge of the shield to be inserted into the channel beyond the serrations into an adhesive-independent mechanical fastening in the channel, the serrations mechanically connecting to the surface of the inserted shield in order to prevent extraction of the inserted shield from the channel; and
at least one crimp, each crimp being placed in at least one of the front wall and the rear wall after the edge of the shield is inserted into the channel so that the serrations are crimped into the surface of the shield, the at least one crimp fastening the inserted shield into an adhesive-independent mechanical fastening in the channel.

15. A protective shield assembly, comprising:
a shield having at least one edge;
a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, the rear wall, and bottom forming a channel;
a plurality of serrations, the serrations extending partially across the channel from the front wall and the rear wall, the serrations being located at varying distances from the bottom of the channel, the serrations allowing the edge of the shield to be inserted into the channel beyond the serrations into an adhesive-independent mechanical fastening in the channel, the serrations mechanically connecting to the surface of the inserted shield in order to prevent extraction of the inserted shield from the channel; and
at least one dimple, each dimple being placed in at least one of the front wall and the rear wall after the edge of the shield is inserted into the channel in such a manner that each dimple penetrates the surface of the shield, the at least one dimple fastening the inserted shield into an adhesive-independent mechanical fastening in the channel.

16. A method of mechanically fastening a protective shield having at least one edge in a frame, the frame including a channel having a front wall, a rear wall spaced apart from the front wall, and a bottom; the bottom securely connecting the front wall to the rear wall; the front wall having an inside facing the rear wall and an outside; the rear wall having an inside facing the front wall and an outside; the method comprising the steps of:
inserting the edge of the shield into the channel; and
crimping at least one of the front wall and the rear wall sufficiently to penetrate the surface of the inserted shield with the crimping and thereby adhesive-independently fastening the shield to channel.

17. The method of claim 16:
wherein the shield is polycarbonate.

18. The method of claim 16 in which the crimping comprises:
at least two dimples.

19. The method of claim 16 in which the channel comprises:
at least one serration, the serration extending partially across the channel from at least one of the front wall and the rear wall, the serration allowing the edge of the shield to be inserted into the channel beyond the serration.

20. A protective shield assembly, comprising:
a shield having at least one edge;
a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel; and
mechanical fastening means, extending partially across the channel from at least one of the front wall and the rear wall, for allowing the edge of the shield to be inserted into the channel and mechanically fastening the inserted shield into an adhesive-independent mechanical fastening in the channel, the fastening means mechancially connecting to the surface of the shield in order to prevent extraction of the shield from the channel, the mechanical fastening means comprising:
at least one crimp, the crimp being located in at least one of the front wall and the rear wall after the edge of the shield is inserted into the channel, the crimp penetrating the surface of the shield in order to prevent extraction of the shield from the channel.

21. A protective shield assembly, comprising:
a shield having at least one edge;
a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel;
mechanical fastening means, extending partially across the channel from at least one of the front wall and the rear wall, for allowing the edge of the shield to be inserted into the channel and mechanically fastening the inserted shield into an adhesive-independent mechanical fastening in the channel, the fastening means mechanically connecting to the surface of the shield in order to prevent extraction of the shield from the channel; and at least one crimp, each crimp being placed in at least one of the front wall and the rear wall after the edge of the shield is inserted into the channel so that the mechanical fastening means and the crimp are crimped into and penetrate the surface of the shield thereby adhesive-independently fastening the shield to the channel.

22. A protective shield assembly, comprising:

a shield having at least one edge;

a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel; and at least one crimp, extending partially across the channel from at least one of the front wall and the rear wall, for allowing the edge of the shield to be inserted into the channel and mechanically fastening the inserted shield into an adhesive-independent mechanical fastening in the channel, the crimp being located in at least one of the front wall and the rear wall after the edge of the shield is inserted into the channel, the crimp penetrating the surface of the shield in order to prevent extraction of the shield from the channel.

23. A protective shield assembly, comprising:

a shield having at least one edge;

a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel; and mechanical fastening means, extending partially across the channel from at least one of the front wall and the rear wall, for allowing the edge of the shield to be inserted into the channel into an adhesive-independent mechanical fastening in the channel, the fastening means penetrating the surface of the shield in order to prevent extraction of the shield from the channel, the mechanical fastening means comprising:

at least one crimp, each crimp being placed in at least one of the front wall and the rear wall after the edge of the shield is inserted into the channel.

24. A protective shield assembly, comprising:

a shield having at least one edge;

a frame, the frame including a front wall, a rear wall spaced apart from the front wall, and a bottom; the bottom securely connecting the front wall to the rear wall; the front wall having an inside facing the rear wall and an outside; the rear wall having an inside facing the front wall and an outside; the front wall, rear wall, and bottom forming a channel; and mechanical fastening means extending partially across the channel from at least one of the front wall and the rear wall, for allowing the edge of the shield to be inserted into the channel into an adhesive-independent mechanical fastening in the channel, the fastening means penetrating the surface of the shield in order to prevent extraction of the shield from the channel, the mechanical fastening means comprising:

at least two dimples, each dimple being placed in at least one of the front wall and the rear wall after the edge of the shield is inserted into the channel.

* * * * *